United States Patent [19]

Satake

[11] Patent Number: 5,345,133
[45] Date of Patent: Sep. 6, 1994

[54] ELECTRIC MOTOR

[75] Inventor: Akiyoshi Satake, Niwa, Japan

[73] Assignee: Okuma Corporation, Aichi, Japan

[21] Appl. No.: 70,754

[22] Filed: Jun. 3, 1993

[30] Foreign Application Priority Data

Jun. 10, 1992 [JP] Japan .................................. 4-176135

[51] Int. Cl.5 .......................................... H02K 1/22
[52] U.S. Cl. .................................. 310/266; 310/156; 310/179
[58] Field of Search ............... 310/266, 156, 181, 179, 310/254, 112, 91

[56] References Cited

U.S. PATENT DOCUMENTS

| | | | |
|---|---|---|---|
| 2,796,542 | 6/1957 | Bekey | 310/266 |
| 2,837,670 | 6/1958 | Thomas | 310/266 |
| 2,928,963 | 3/1960 | Bertsche | 310/266 |
| 3,484,635 | 12/1969 | MacKallor, Jr. | 310/156 |
| 3,602,749 | 8/1971 | Esters | 310/266 |
| 3,629,626 | 12/1971 | Abbott | 310/266 |
| 4,757,220 | 7/1988 | Pouillange | 310/266 |
| 5,004,944 | 4/1991 | Fisher | 310/266 |
| 5,081,388 | 1/1992 | Chen | 310/266 |
| 5,212,419 | 5/1993 | Fisher | 310/254 |

*Primary Examiner*—R. Skudy
*Attorney, Agent, or Firm*—Wenderoth, Lind & Ponack

[57] ABSTRACT

High permeability material plates used to construct the stators and the rotor of a motor are formed of the same material, thus reducing the number of fabrication processes and material cost. Also, the rotor containing permanent magnets is cylindrical and two stators are arranged around the inner circumference and the outer circumference of the permanent magnets, respectively, thereby increasing efficiency.

3 Claims, 5 Drawing Sheets

→ FLOW OF MAGNETIC FLUX

ELECTRIC MOTOR

BACKGROUND OF THE INVENTION

1. Field of the Invention

The present invention relates to an electric motor using permanent magnets.

2. Description of the Related Art

FIG. 1 is a cross sectional view showing one example of a conventional electric motor using brushless-type permanent magnets. A plurality (6 in the drawing) of permanent magnets 51 are fastened by adhesives or the like to the surface of the outer circumference of a shaft member 53 which is rotatably supported at its both ends by bearing or the like so as to form a rotor. A plurality of ring-shaped high permeability material plates 52, having teeth spaced apart on the inner circumference surface thereof and gapped from the outer circumference surface of the rotor, are laminated so as to form a stator. The rotation of the rotor is controlled relative to the stator in accordance with a signal from a detector or the like arranged at one end of the shaft member 53.

In conventional electrical motors, sintered materials such as ferrite or rate earth elements are generally used as materials for permanent magnets. However, these materials are fragile, and when subjected to impact, the possibility of damaging these materials exists, especially during assembly and transportation. In order to solve the above-mentioned problems, the permanent magnets are protected by winding a glass fiber or a carbon fiber around the permanent magnets, and further by providing reinforcement thereon using a resin or the like. However, this requires an increase in the number of fabrication processes, and the materials utilized are too costly. Also, since the high permeability material plates are produced by punching, those portions of the high permeability material plates into which a rotor is inserted cannot be used again and are abandoned, thus wasting materials. If the shaft member is formed of a high permeability material, the magnetic flux from the magnets brings about a magneto-resistance when it passes through the shaft member. On the other hand, when the shaft member is formed of a non-high permeability material, the magnetic flux from the magnets brings about a magneto-resistance which has substantially the same magnetic permeability as air. In the former case, a leakage of flux occurs and travels axially in the shaft member, thereby magnetically producing a negative influence upon a detector or a loading device positioned at one end of the shaft. In the latter case, the magnetic force of the permanent magnets is decreased, thus resulting in a reduction in efficiency.

SUMMARY OF THE INVENTION

In view of the foregoing problems, an object of the present invention is to provide an electric motor of high efficiency at reasonable cost.

To achieve these objects, the present invention provides an electric motor including: a plurality of permanent magnets arranged along the circumference of a shaft member, a rotor formed by combining a cylindrical member covering the permanent magnets with a high permeability material and the shaft in a magnetically insulating condition, and a cylindrical first stator and second stator formed of the same material as the high permeability material, the stators include teeth on the respective inner circumference surface and outer circumference surface thereof, the teeth being gapped from the outer circumference surface and the inner circumference surface of the cylindrical member.

In the present invention, since the high permeability material plates consisting of the stators and the rotor are formed of the same material, the number of fabrication processes and the material cost can be reduced. Also, the permanent magnets are shaped to be cylindrical and each of the two kinds of stators is arranged around the inner circumference and the outer circumference of the permanent magnets, thereby increasing efficiency.

DESCRIPTION OF THE PREFERRED EMBODIMENTS

Figure 1:
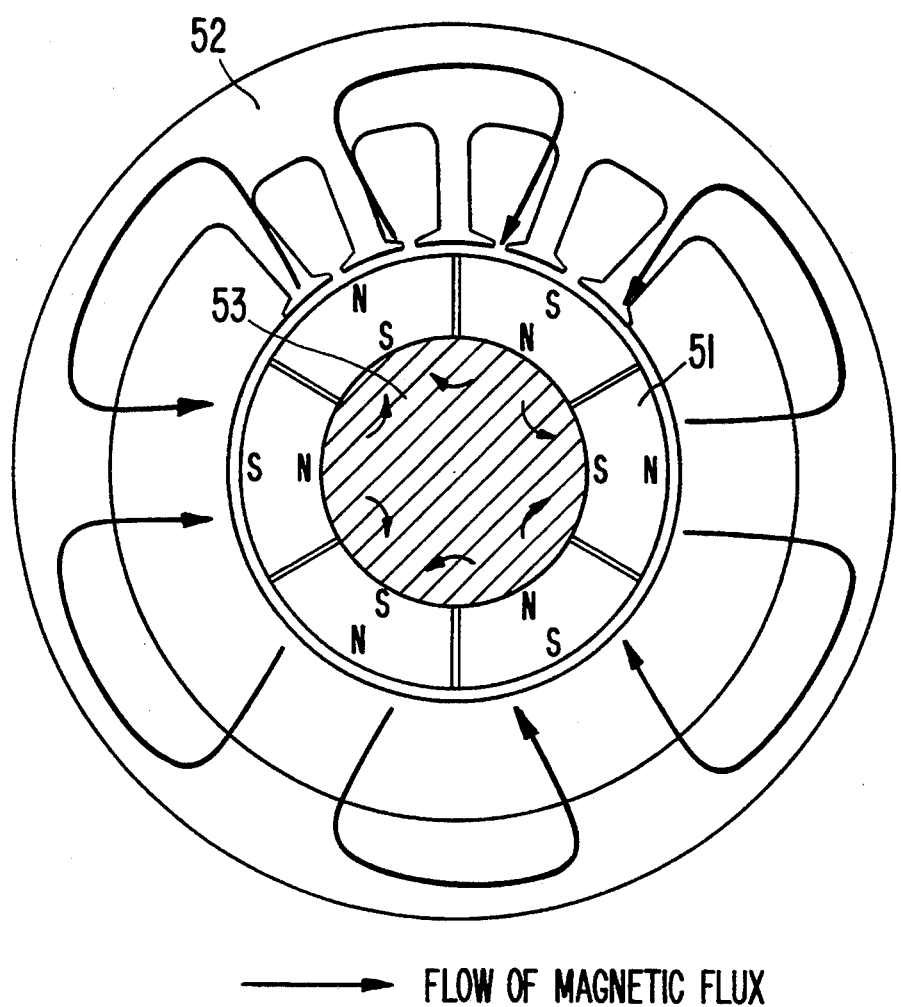
FIG. 1 is a cross sectional view showing one example of a conventional electric motor.
Figure 2:
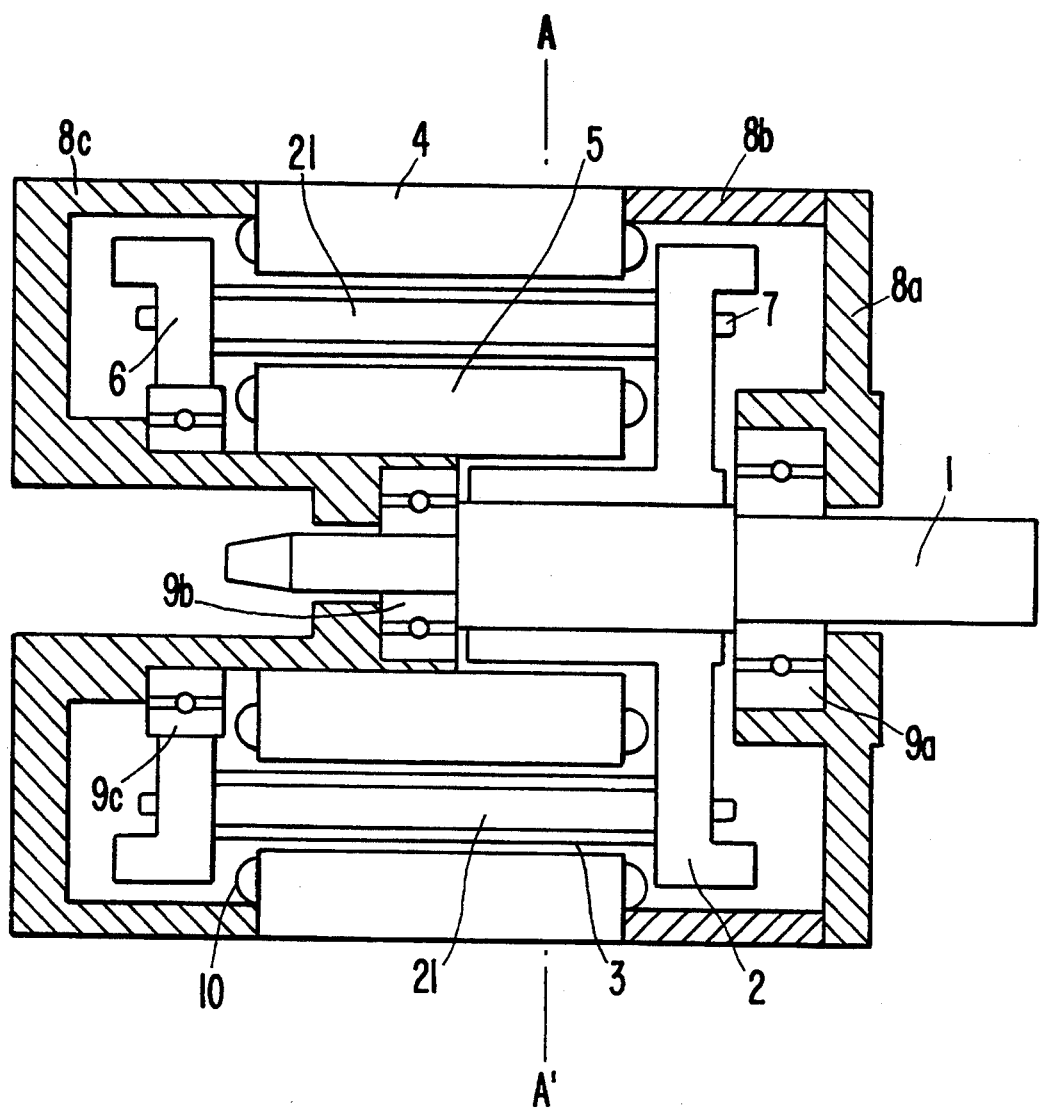
FIG. 2 is a longitudinal sectional view showing one example of an electric motor according to the present invention.
Figure 3:
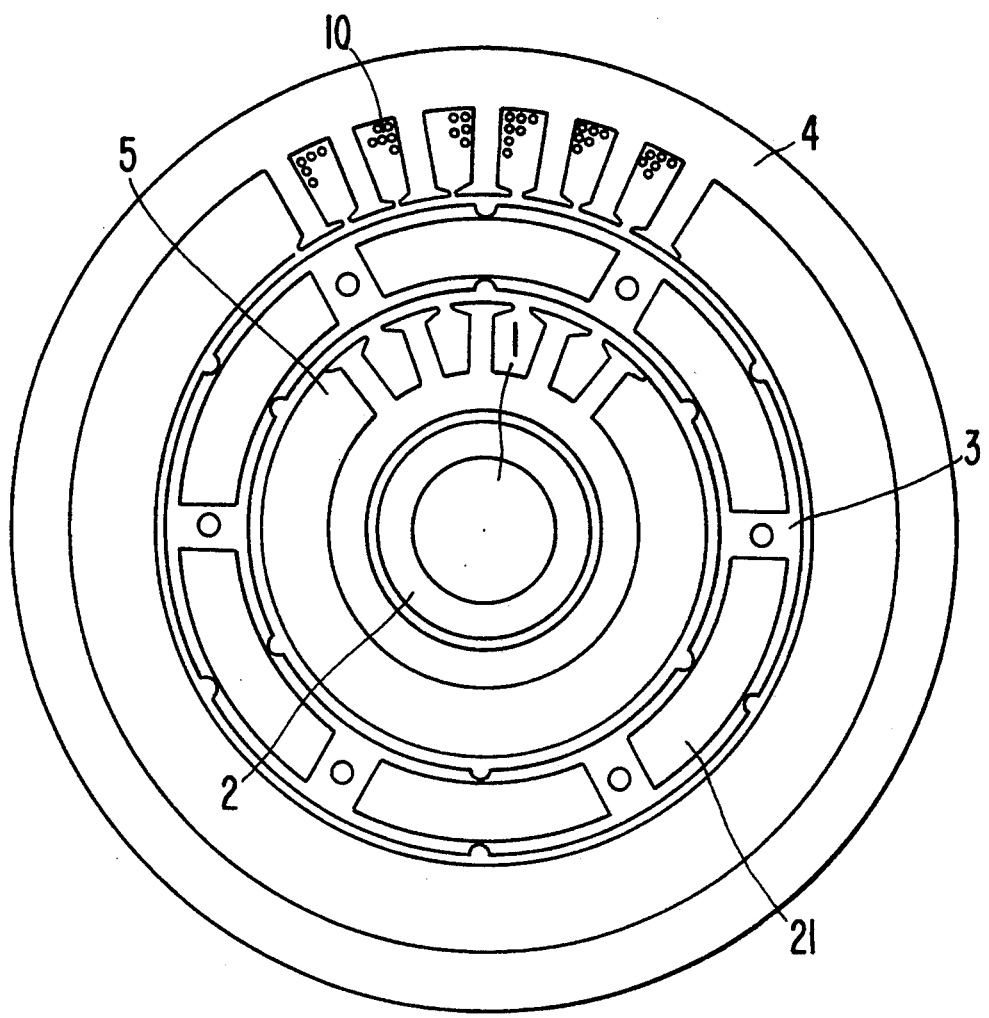
FIG. 3 is a cross sectional view taken on line A—A' of FIG. 2.
Figure 4:
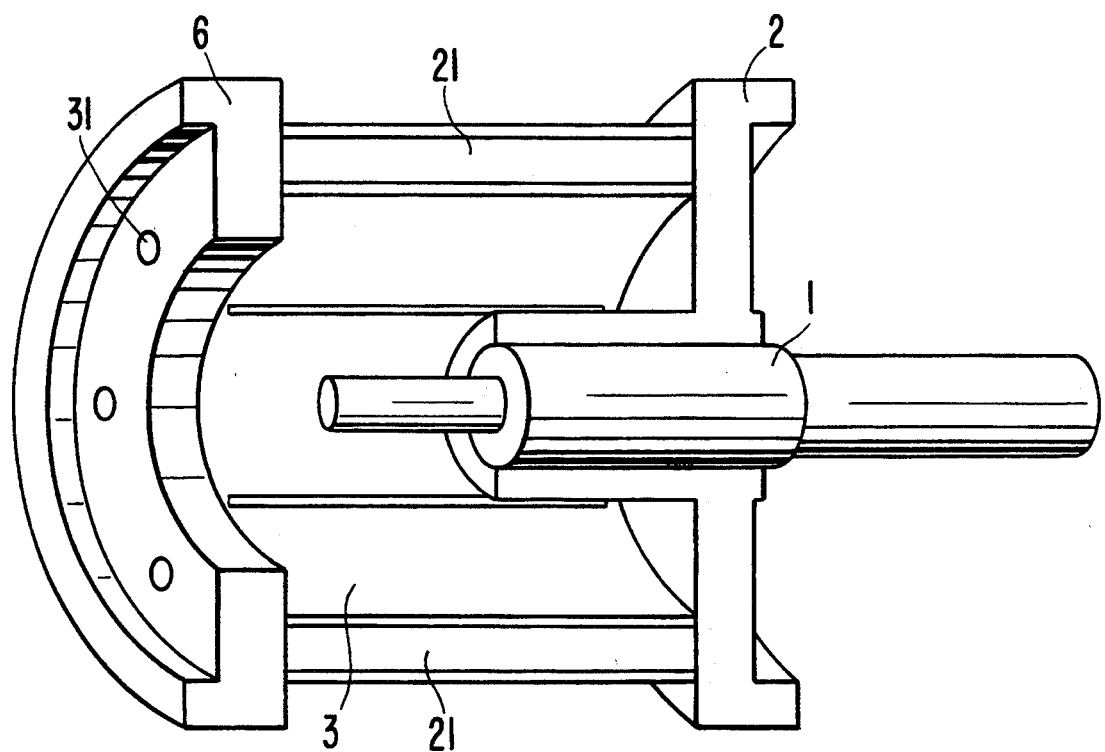
FIG. 4 is a partially cutaway perspective view showing the electric motor of the present invention.

An embodiment of the present invention will be described hereinafter with reference to the accompanying drawings. FIG. 2 is a longitudinal sectional view showing one example of an electric motor utilizing brushless-type permanent magnets. FIG. 3 is a cross sectional view taken on line A-A' of FIG. 2. A shaft member 1 is rotatably supported by bearings 9a and 9b fitted into flanges 8a and 8c, respectively. A plurality (6 in the drawing) of permanent magnets 21 are arranged along the circumference of the shaft member 1. As shown in FIG. 4, a cylindrical rotor yoke member 3 covered with a plurality of laminated high permeability material plates are clamped at its both ends by a holder 2 formed of a non-high permeability material which is fastened to the shaft member 1 and by a disk 6 formed of a non-high permeability material which is rotatably supported by a bearing 9c fitted into the flange 8c. A support shaft 7 passes through the holder 2, the rotor yoke member 3 and the disk 6, thereby securing the rotor yoke member 3. The holder 2 and the disk 6 also function to achieve the advantage of a balancer weight.

An exterior stator 4 which is laminated by a plurality of ring-shaped high permeability material plates and which has radially formed teeth gapped from the outer circumference surface of the rotor yoke member 3 on the inner circumference surface of the exterior stator 4 are fastened to the flanges 8b and 8c. An interior stator 5 which is laminated by a plurality of ring-shaped high permeability material plates and which has radially formed teeth gapped from the inner circumference of the rotor yoke member 3 on the outer circumference surface of the interior stator 5 is forced into the flange 8c. Windings 10 extend axially between and around the teeth of each stator. The ratio of the number of teeth of the interior stator 5 to that of the exterior stator 4 is n:m ($n \leq m$, n and m are integers of 10 or less.), for example, 1:1, 1:2, 1:3, 2:3, or the like. Also, as clearly shown in FIG. 3, the number of outer starter teeth exceeds the number of permanent magnets 21.

Figure 5:
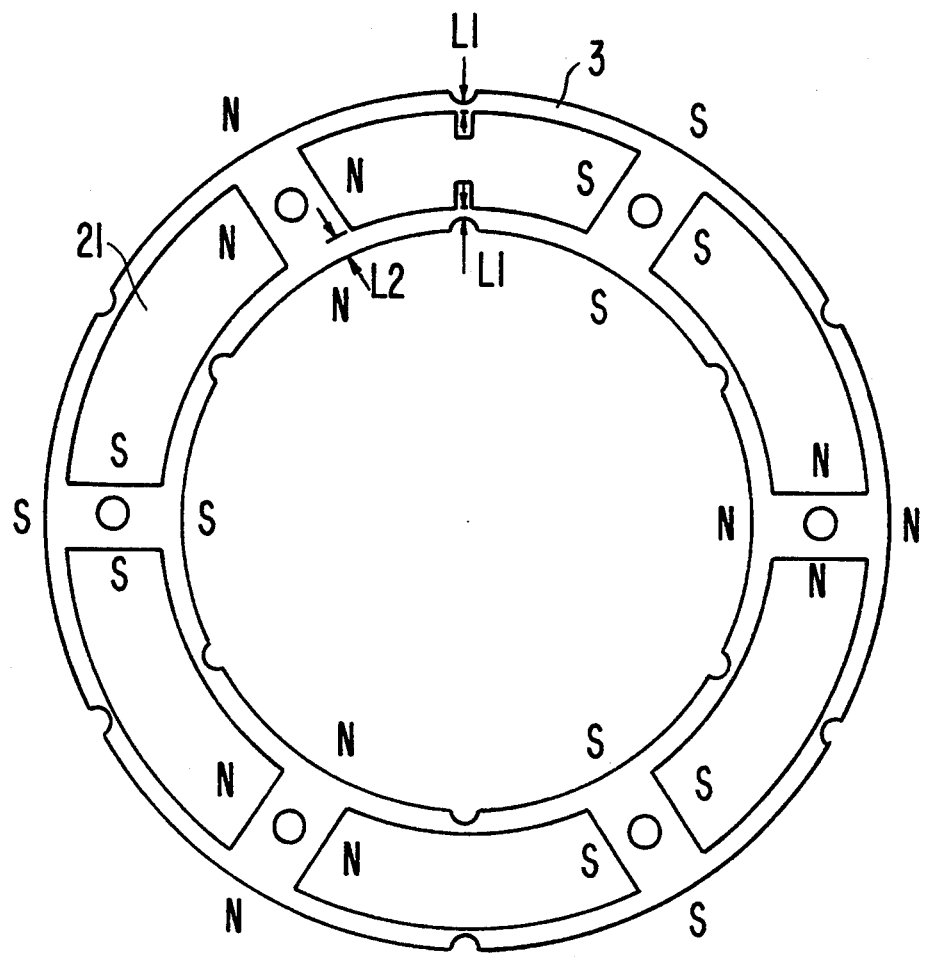
FIG. 5 is a view representing the relationships of the magnetic poles of the electric motor according to the present invention.

FIG. 5 is a view showing the relationship between the high permeability material plates of the rotor yoke member 3 and the magnetic poles of the permanent magnets 21. In this example, the orientation of the permanent magnets 21 is set circumferentially, and thus the diametrical magnetic pole of the inner circumference and that of the outer circumference are the same. Also, grooves (L1<<L2) are provided so as to cause magnetic saturation at these grooves which further reduces magnetic short-circuiting. The orientation of the permanent magnets may be set diametrically where the permanent magnets are arranged alternately so as to have opposite poles next to each other and where the grooves are provided between the neighboring permanent magnets.

The permanent magnets 21 are protected by the high permeability material plates of the rotor yoke member 3. Thus, a glass fiber, a carbon fiber, a resin, or the like which conventionally protect permanent magnets are no longer required. Also, since the high permeability material plates of the rotor yoke member 3 and those of the exterior stator 4 and the interior stator 5 are formed of the same material, the waste of material can be minimized. Further, two types of stators, i.e. the exterior stator 4 and the interior stator 5 are disposed, and thus the diameter of windings can be widened and the number of windings can be distributed, thereby inhibiting heat generation. Still further, since magnetic saturation can be avoided in the teeth of the exterior stator 4 and the interior stator 5, magnets of high performance such as samarium-cobalt or neodymium can be used as the permanent magnets 21. The exterior stator 4 and the interior stator 5 are arranged on the outer circumference and the inner circumference of the rotor yoke member 3, respectively, thereby lessening the loss of magnetic energy of the permanent magnets 21. The rotor yoke member 3 and the shaft member 1 are insulated space from each other, thus preventing the leakage of flux from travelling to the shaft body 1.

In a conventional electric motor, a stator is arranged gapped from the surface of the outer circumference (or the inner circumference) of a rotor. However, the rotor yoke member of the electric motor according to the present invention is adapted to magnetize the magnetic flux of permanent magnets via high permeability material plates covering the permanent magnets (the orientation of the magnetomotive force of the permanent magnets is circumferential). In this type of the rotor yoke member, the magnetic flux is relatively less constrained. Hence, a stator is place gapped from the outer circumference (or the inner circumference) of the rotor yoke member, and thus the armature inductance and the armature reaction are great, which further results in an increase of cogging torque of the electric motor beyond that of a conventional electric motor.

Cogging torque occurs due to a shift of the magnetic energy stored in the gaps because of the relative positions between the magnetic poles of the rotor yoke member and the stators having slots, or due to pulsation of gap permeance.

In view of the foregoing problems, the electric motor of the present invention is constructed such that the stators are disposed gapped from both the outer circumference surface and the inner circumference surface of the rotor yoke member. One of the stators is employed mainly for the purpose of improving efficiency.

More specifically, it is desired that the characteristics of the electric motor be improved by the following construction. In order to minimize a shift of the magnetic energy stored in the gaps between the rotor yoke member and the stators as much as possible, the proportions of the number of gear teeth on the surface of the outer circumference and the number on the inner circumference are differentiated, thereby causing rotation torque mainly by one of the stators and performing an active control such as minimizing a shift of the magnetic energy mainly by the other stator.

As stated above, according to the electric motor of the present invention, a conventional protecting material is no longer required for permanent magnets, and accordingly the waste of high permeability material plate is minimized, thus significantly reducing the cost. Also, heat generation is reduced as much as possible and the loss of magnetic energy is reduced, thus significantly improving efficiency. Further, the leakage of flux can be avoided, thereby precluding a magnetically negative influence upon peripheral devices.

What is claimed is:

1. An electric motor comprising:

a rotational shaft which rotates about a rotational axis thereof;

a cylindrical rotor including a plurality of permanent magnets embedded within a high permeability material, said plurality of permanent magnets spaced apart and juxtaposed along a circumference of said cylindrical rotor with said high permeability material;

a coupling member made of a non-high permeability material which couples said rotational shaft to said cylindrical rotor such that the rotational axis of said rotational shaft coincides with a rotational axis of said cylindrical rotor;

an outer cylindrical stator, formed of said high permeability material, which is coaxial said cylindrical rotor and has an inner peripheral surface confronting an outer peripheral surface of said cylindrical rotor, said outer cylindrical stator including a plurality of spaced apart outer stator teeth protruding radially inward towards said cylindrical rotor and extending lengthwise from one end of said outer cylindrical stator to another end of said outer cylindrical stator, said plurality of spaced apart outer stator teeth being spaced from said outer peripheral surface of said cylindrical rotor and defining grooves therebetween which are spaced apart and juxtaposed along said inner peripheral surface of said outer cylindrical stator, wherein a total number of said plurality of spaced apart outer stator teeth exceeds a total number of said plurality of permanent magnets;

an inner cylindrical stator, formed of said high permeability material, which is coaxial with said cylindrical rotor and has an outer peripheral surface confronting an inner peripheral surface of said cylindrical rotor, said inner cylindrical stator including a plurality of spaced apart inner stator teeth protruding radially outward towards said cylindrical rotor and extending lengthwise from one end of said inner cylindrical stator to another end of said inner cylindrical stator, said plurality of spaced apart inner stator teeth being spaced from said inner peripheral surface of said cylindrical rotor and defining grooves therebetween which are spaced apart and juxtaposed along said outer peripheral surface of said inner cylindrical stator;

a plurality of windings respectively extending lengthwise along and within said grooves defined by said inner stator teeth and outer stator teeth.

2. An electric motor as claimed in claim 1, wherein each of said cylindrical rotor, said cylindrical inner stator and said cylindrical outer stator are formed of a laminate of radially arranged plates made from said high permeability material.

3. An electric motor as claimed in claim 1, wherein a ratio between a total number of said outer stator teeth and a total number of said inner stator teeth is m:n, where m and n are positive integers and where m>n, and wherein, at a given rotational position of said cylindrical inner and outer stators, every m/n th outer stator teeth is radially aligned in symmetry with a one of said inner stator teeth.

* * * * *